(12) United States Patent
Madera et al.

(10) Patent No.: US 8,905,172 B2
(45) Date of Patent: Dec. 9, 2014

(54) INTEGRATED SERVICE CENTER

(71) Applicant: Caterpillar Inc., Peoria, IL (US)

(72) Inventors: Robert J. Madera, Lemont, IL (US);
Joshua C. Bedyk, Sandwich, IL (US);
Jeffrey P. Sayre, Naperville, IL (US);
Adam M. Plecker, Joliet, IL (US)

(73) Assignee: Caterpillar Inc., Peoria, IL (US)

( * ) Notice: Subject to any disclaimer, the term of this patent is extended or adjusted under 35 U.S.C. 154(b) by 71 days.

(21) Appl. No.: 13/849,921

(22) Filed: Mar. 25, 2013

(65) Prior Publication Data

US 2014/0284126 A1 Sep. 25, 2014

(51) Int. Cl.
*B60R 19/48* (2006.01)
*B62D 25/24* (2006.01)

(52) U.S. Cl.
CPC .............. *B62D 25/24* (2013.01); *B60R 19/48* (2013.01)
USPC .......................................... 180/89.1; 307/125

(58) Field of Classification Search
CPC ........ B60R 19/48; B62D 25/24; B23K 11/24; H02H 11/008; H02H 1/00; H02J 9/00; H01H 83/00
USPC ............. 180/89.1, 311; 307/112, 125; 361/42
See application file for complete search history.

(56) References Cited

U.S. PATENT DOCUMENTS

| 2,866,510 | A  | * | 12/1958 | Flamm ........................ 180/53.7 |
| 3,583,513 | A  | * | 6/1971  | Macadam et al. ......... 180/69.24 |
| 5,460,420 | A  | * | 10/1995 | Perkins et al. ................ 293/106 |
| 6,282,070 | B1 | * | 8/2001  | Ziegler et al. .................. 361/42 |
| 6,822,347 | B2 | * | 11/2004 | Roley ............................ 307/112 |
| 7,216,818 | B2 | * | 5/2007  | Lee ............................ 239/284.1 |
| 7,677,631 | B1 | * | 3/2010  | Zischke et al. ............. 296/97.22 |
| 8,070,196 | B2 | * | 12/2011 | Couto et al. .................. 293/118 |
| 2007/0131466 | A1 | * | 6/2007 | Gutzwiller et al. .......... 180/89.1 |
| 2014/0084608 | A1 | * | 3/2014 | Hasegawa et al. ............ 293/132 |

FOREIGN PATENT DOCUMENTS

WO  WO 96/15010 A1  5/1996

* cited by examiner

*Primary Examiner* — Karen Beck
(74) *Attorney, Agent, or Firm* — Leydig, Voit & Mayer, Ltd.

(57) ABSTRACT

An integrated service center has an outward facing wall. A first and second section are recessed from the outward facing wall, each with a plurality of walls and a lower end, which forms an opening in the lower end and extends to the outward facing wall. The first section has a fluid access point disposed at an angle between 30 and 60 degrees below a reference plane. The second section has an electrical access point. A door assembly is mounted to move between an open and closed, which abuts the outward facing wall and covers the first section when closed.

20 Claims, 6 Drawing Sheets

INTEGRATED SERVICE CENTER

TECHNICAL FIELD

This patent disclosure relates generally to an integrated service center associated with a mobile machine and, more particularly to an integrated service center with electrical access points and angled fluid access points.

BACKGROUND

Some large mobile machines, such as those used in the mining industry, may have a frame elevated several feet about the ground on a traction device, such that the height from the ground to the bottom of the machine frame is taller than the average service technician. These mobile machines require regular maintenance and monitoring to work properly. Fluid and electrical access points for maintenance may be located at various points on the machine or centralized in a service center. A service center provides easy access to systems that are regularly access for maintenance, such as fluid and electrical access points.

U.S. Patent Application Publication No. 2007/0131466, for example, teaches the placement of certain fluid and electrical access points in a centralized box underneath the steps of a mobile machine.

SUMMARY

The disclosure describes, in one aspect, an integrated service center for a mobile machine. The integrated service center has an outward facing wall having a substantially vertical orientation. The integrated service center has a first section recessed from the outward facing wall, with a plurality of walls and a lower end. The plurality of walls forms an opening in the lower end. The opening extends to the outward facing wall. At least one fluid access point is disposed in the first section at an angle to a substantially horizontal reference plane. The angle can be between 30 and 60 degrees below the reference plane. A second section is recessed from the outward facing wall with at least one electrical access point disposed in the second section. At least one door assembly is mounted to move between an open position and a closed position. The door assembly is disposed to abut at least a portion of the outward facing wall and cover at least the first section when in the closed position.

BRIEF DESCRIPTION OF THE DRAWING(S)

DETAILED DESCRIPTION

Figure 1:
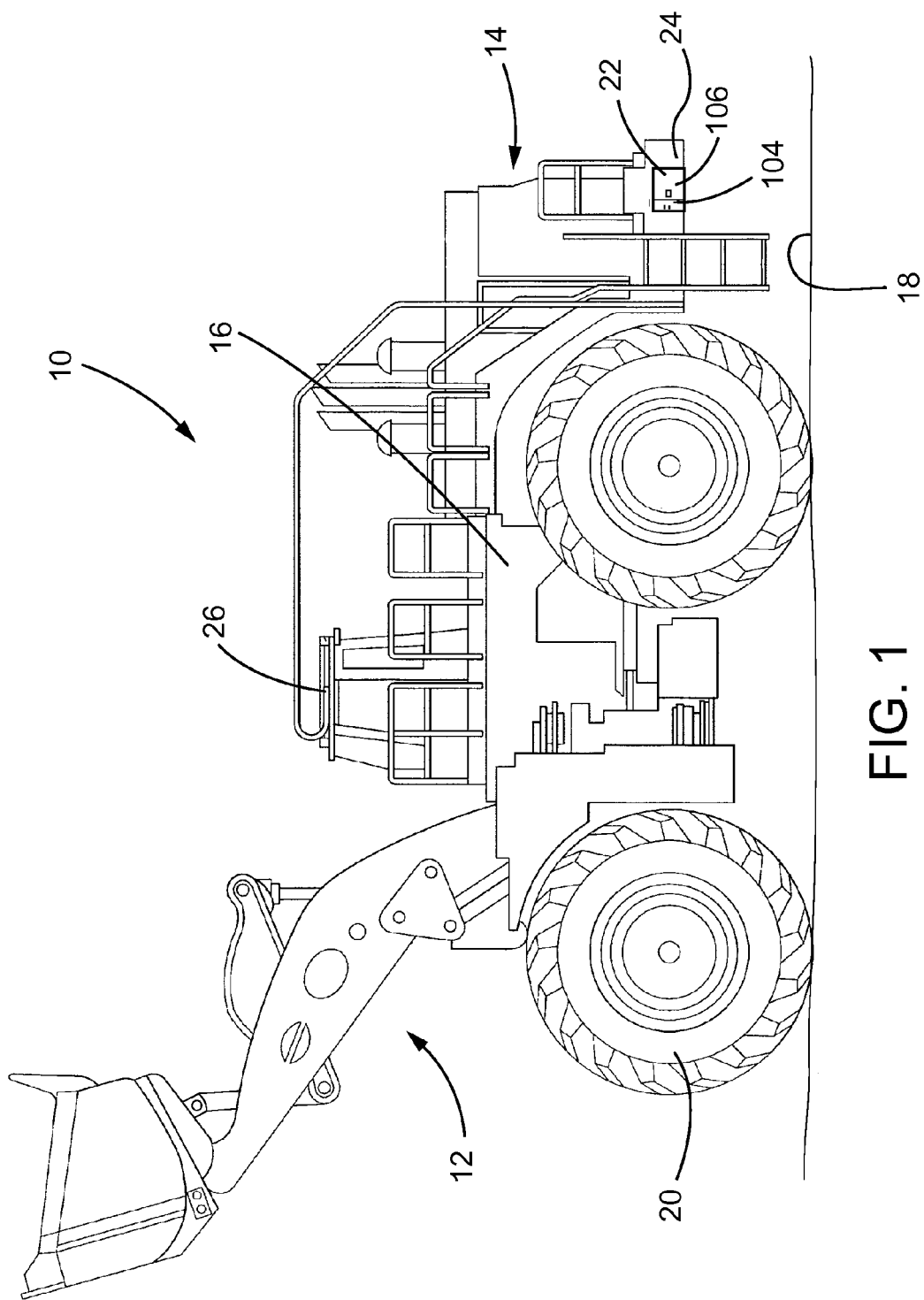
FIG. 1 is a left side elevational diagrammatic view of a mobile machine having an integrated service center according to aspects of the disclosure.

This disclosure relates to a mobile machine 10, such as a wheel loader as shown in FIG. 1. The mobile machine 10 has a chassis, which includes a frame (not shown), an implement end 12, an engine end 14, and at least two sides, where at least one of the two sides is an operator access side 16 for an operator station 26. The mobile machine 10 has at least one traction device 20, which can engage a ground surface 18, which for the purposes of this disclosure may be considered generally horizontal. The mobile machine 10 further includes at least one bumper 24 that, for the purposes of this disclosure, is located along at least a portion of the operator access side 16. The illustrated bumper 24 also extends along the engine end 14 of the mobile machine 10 and wraps around the operator access side 16, although it will be appreciated that multiple such bumpers may be provided at varied locations on the mobile machine 10, if desired.

Figure 2:
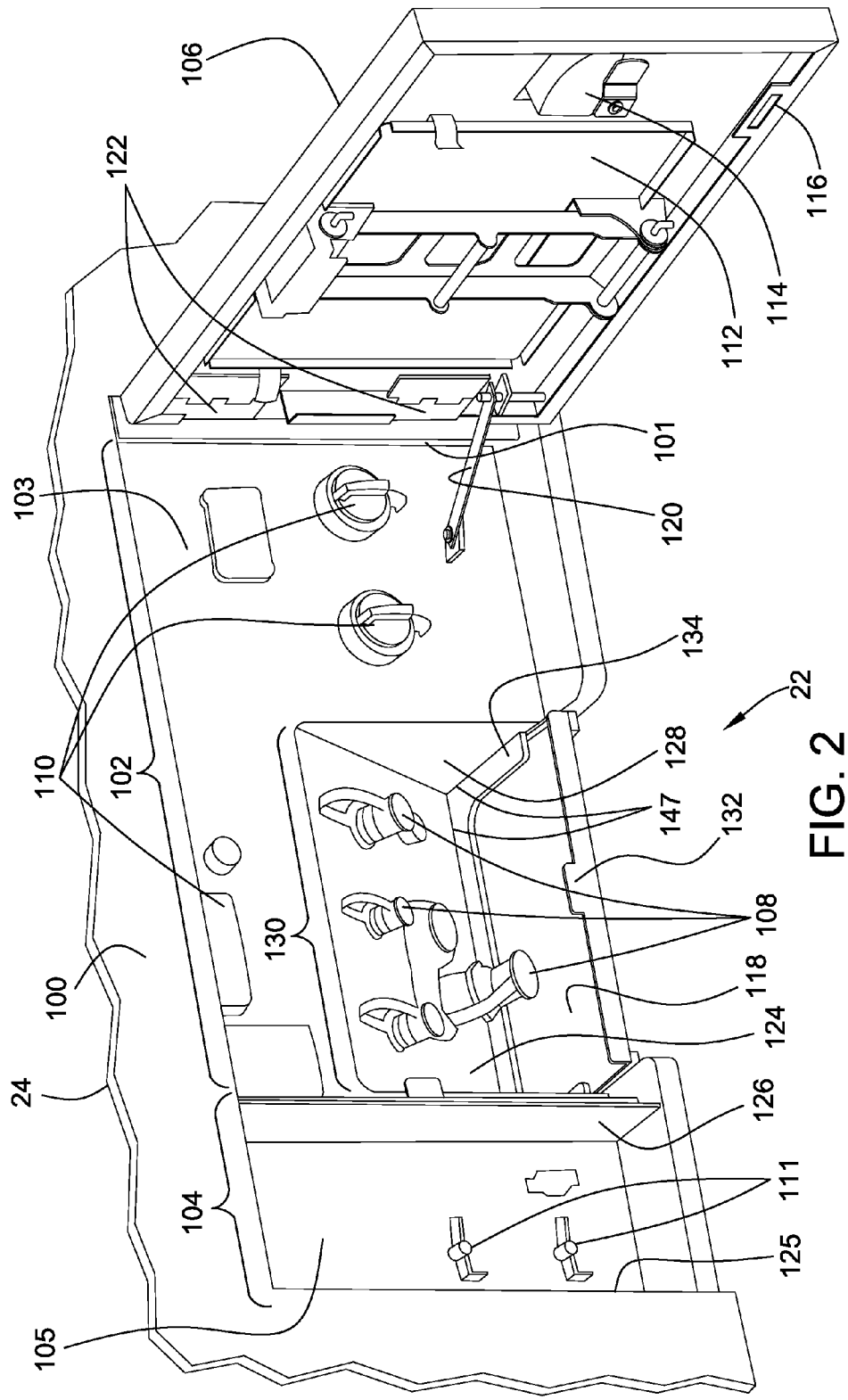
FIG. 2 is an isometric view of an integrated service center according to aspects of the disclosure with an open door, and having a table assembly in a stored position on the door assembly.

As may be viewed more easily in FIG. 2, the bumper 24 of the mobile machine 10 includes an outward bumper face 100 substantially vertical, that is, generally perpendicular to the ground surface 18. An integrated service center 22 is disposed in the bumper 24 along the operator access side 16. According to an aspect of the disclosure, the integrated service center 22 does not substantially extend outward beyond the outward bumper face 100. In order to accommodate the integrated service center 22, the bumper 24 may be formed, for example, with a cutout or a recess in which the integrated service center 22 is disposed. To add further structural integrity to the arrangement, the area of the bumper 24 surrounding the cutout or recess may be structurally reinforced.

Referring now to FIGS. 2-5, an exemplary integrated service center 22 is illustrated. The illustrated integrated service center 22 has two sections, a first section 102 and a second section 104, although a greater or lesser number of sections may be provided. The integrated service center 22 may include an outwardly facing wall 101 that may be, for example, substantially coplanar with the outward bumper face 100 in an installed position. The first section 102 and second section 104 are recessed from the outward bumper face 100 and/or the outward facing wall 101. A separating wall 126 may extend at least partially between the first section 102 and the second section 104.

The first section 102 contains a plurality of fluid access points 108 and may contain a plurality of electrical access points 110. The second section 104 contains a plurality of electrical access points 111 and may contain a plurality of fluid access points (not shown). The fluid access points 108 may include, but are not limited to, fill ports and drain ports for the machine's fluids. These fluids may include, but are not limited to, hydraulic steering fluid, hydraulic implement fluid, brake fluid, engine oil, engine coolant, lubricating fluid, and transmission fluid. The electrical access points 110, 111 may include, but are not limited to, battery lockout switches, engine lockout switches, transmission lockout switches, service lighting switches, indicator lights, VIMS diagnostic screens, VIMS key switch, VIMS service ports, ET service ports, 240 VAC heater system, keypads, high voltage indicator, powered access ladder switch, engine shutoff switch, stairway light switch, diesel exhaust fluid purge lamp, jump start receptacle, message displays, power ports, service center light switch, gauges, sensors, relays, and fuses.

Figure 5:
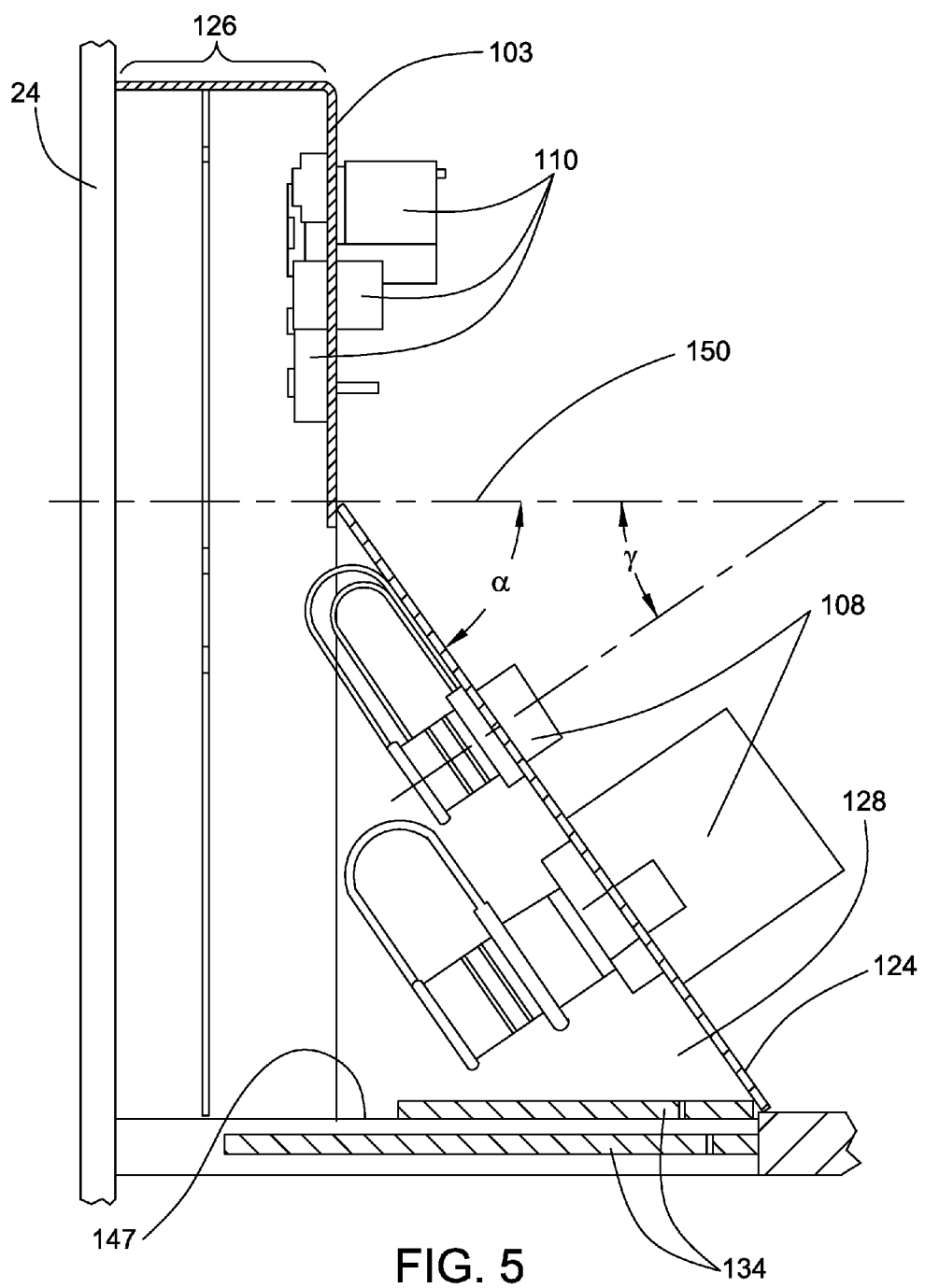
FIG. 5 is a cross-sectional view of the integrated service center taken along line 5-5 in FIG. 3.

Referring to FIG. 5, to facilitate connection to a fluid access point 108, the fluid access point 108 may be disposed at an angle γ to a substantially horizontal plane 150, which is generally disposed substantially parallel to the ground surface 18. The angle γ may be dependent upon the specifics of the mobile machine 10, and, in particular, a distance that the fluid access point 108 is disposed above the ground surface 18. The angle γ will generally be greater when the fluid access point 108 is further from the ground surface 18, and less when the fluid access point 108 is closer to the ground surface. In most embodiments, the fluid access point 108 will be at an angle γ between 30 degrees and 60 degrees; while in some embodiments, the angle γ will be between 45 and 60 degrees. In an embodiment, for example, the angle γ may be 45 degrees.

In order to protect the fluid and electrical access points 108, 110, 111 from damage, they are recessed from the outward bumper face 100 of the bumper 24 and/or the outwardly facing wall 101. As may best be seen in FIGS. 2 and 3, walls 103, 105 of the first and second sections 102, 104 respectively, may be further recessed. The electrical access points 110, 111 are presented in the illustrated embodiment along the respective wall 103, 105 of the first and second sections 102, 104. The first section 102 may have a further recess 130 from the wall 103 extending along a portion of the first section 102, which may contain, for example, the fluid access points 108. To provide further support to one or more of the fluid or electrical access points 108, 110, the recess 130 may contain an angled surface 124. Here, the angled surface 124 is bordered by two side walls 128. The fluid access points 108 may extend perpendicularly, or at any other suitable angle, through the angled surface 124.

Referring to FIG. 5, the angled surface 124 forms an angle α with the substantially horizontal plane 150, which is generally disposed substantially parallel to the ground surface 18. The angle α can be any suitable angle. By customizing the angle α based upon the specifics of a given mobile machine 10, a person performing maintenance on the mobile machine 10 standing on the ground surface 18 may have easier access to the fluid access points 108 in the integrated service center 22. The angle α, for example, may be varied to account for the height of the bottom of the bumper 24 above the ground surface 18. For example, a smaller mobile machine 10 might have an angle α of 90 degrees, whereas a vehicle with a bumper 24 located a greater distance from ground surface 18 might have an angle α of 0 degrees. In most embodiments, the angled surface 124 will be at an angle α between 30 degrees and 60 degrees. In an embodiment, for example, the angle α may be 45 degrees.

Access to the fluid access points 108 may be further enhanced by the recess 130 of the first section 102 having an opening 148 in the bottom. In the illustrated embodiment, the opening 148 is formed at a lower end 147 of the recess 130 by a walls 128. Although not shown in the illustrated embodiment, the second section 104 may similarly include an opening at a lower end of walls 105, 125, 126. Such an opening 148 may provide unobstructed access to the fluid access points 108. The opening 148 in the first section 102 allows debris and fluid to exit the first section 102 under the influence of gravity. An opening at the lower end of the second section 104 would function similarly.

To inhibit dirt and debris from entering the interior of the integrated service center 22, however, a removable bottom panel 118 may be provided. While alternate coupling arrangements may be provided, in the illustrated embodiment, the at least two side walls 128 may each present at least one flange 134 located towards the lower end 147 of the side wall 128. While the side walls 128 may directly include a recess or slot therethrough, this embodiment includes a pair of substantially U-shaped flanges 134, which extend from the angled surface 124 and the side walls 128 of the recess 130. In this way, the bottom panel 118 may be disposed to substantially cover the opening 148, slid between the flanges 134 located on each side wall 128. Bottom panel 118 may be removed from the opening 148, such as by sliding the bottom panel 118 along the flanges 134 and away from the angled surface 124. The bottom panel 118 may have a tab 132, the significance of which will be explained below.

Figure 3:
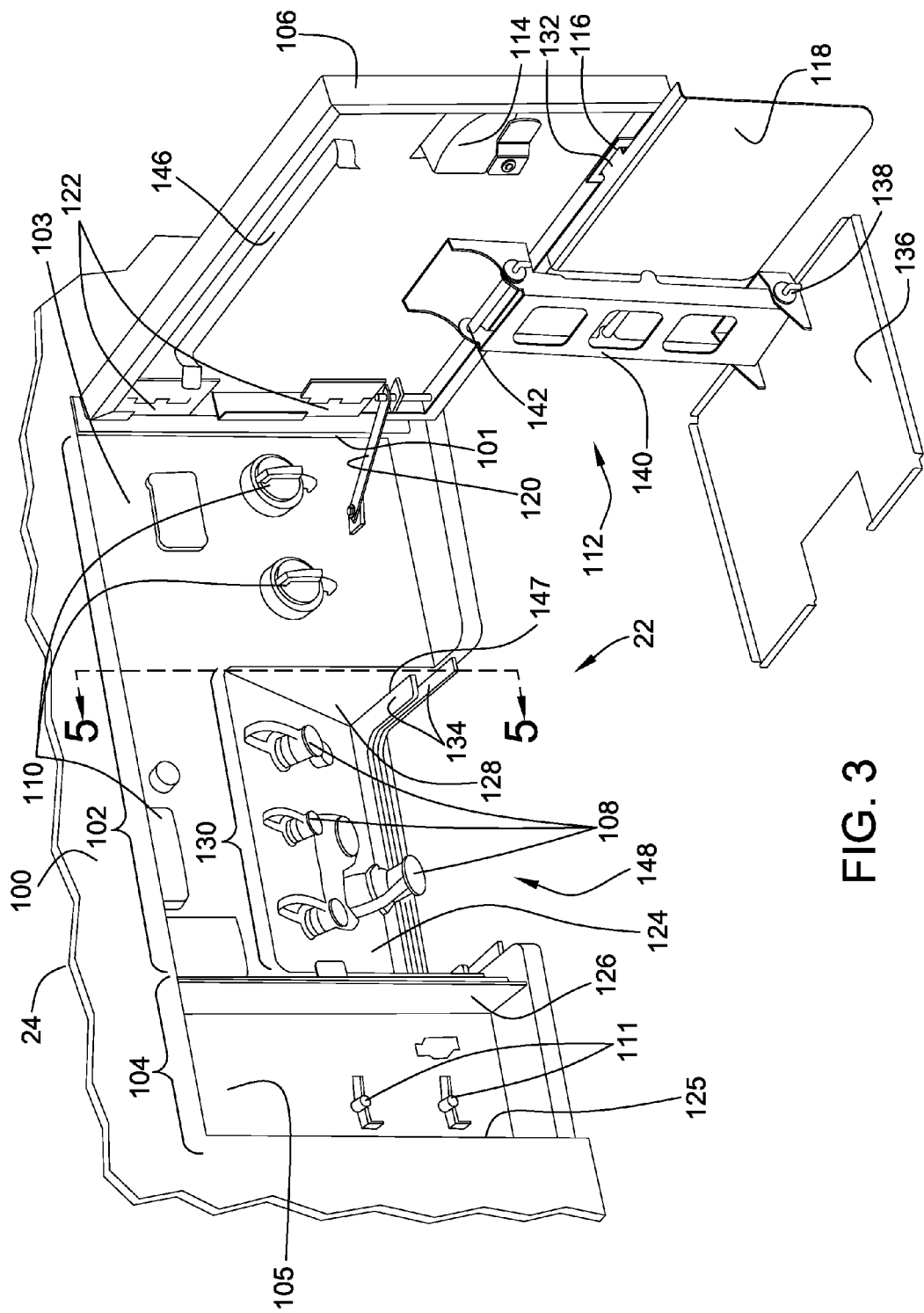
FIG. 3 is an isometric view of the integrated service center shown in FIG. 2, with a table assembly in an extended position, and a bottom panel in a stored position.
Figure 4:
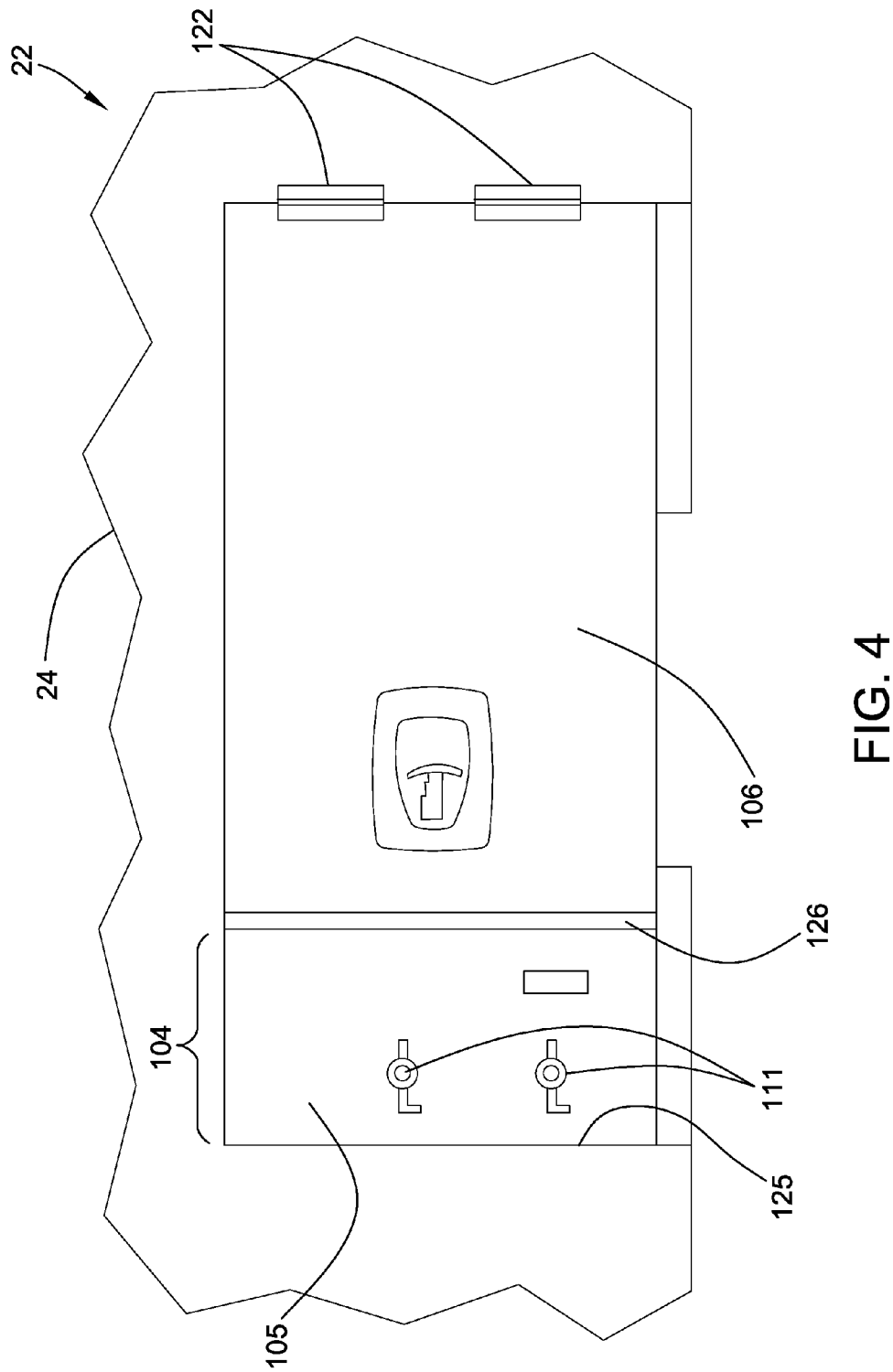
FIG. 4 is a front elevational view of the integrated service center with a closed door.

In order to protect the fluid and electrical access points 108, 110, 111 housed within the integrated service center 22, a door assembly 106 may be provided to cover one or both of the first and second sections 102, 104. The door assembly 106 is illustrated in FIG. 2, FIG. 3, and FIG. 4. The door assembly 106 may be attached to the integrated service center 22 or to the bumper 24 in any suitable manner, such as with at least one door hinge 122. The door hinge 122 attaches on one end to the door assembly 106 and on a second end to at least one of the outward bumper face 100 and the first or second section 102, 104. The door assembly 106 may rotate about the door hinge 122 from an open position as shown in FIG. 2 and FIG. 3 to a closed position as shown in FIG. 4. When in a closed position, the door assembly 106 does not substantially extend outward from the bumper 24 beyond the outward bumper face 100. The door assembly 106 may be, for example, flush with or recessed from the outward bumper face 100 when in a closed position.

It will be appreciated that, depending on the size and location of the door assembly 106, when the door assembly 106 is in a closed position the door assembly 106 may enclose the first section 102, the first section 102 and the second section 104, or only the second section 104 in alternate embodiments. Although only one such door assembly 106 is illustrated, in an alternate embodiment, the integrated service center 22 may have a second door assembly to cover separate sections or portions of sections.

As a further option, the removable bottom panel 118 discussed above may be temporarily coupled to the door assembly 106 during service on the mobile machine 10. Although any appropriate coupling mechanism may be provided, in the illustrated embodiment, the door assembly 106 may have a slot 116 for interfacing with the tab 132 located on the bottom panel 118, as illustrated in FIG. 3.

To assist in maintaining the door assembly 106 in an open position during service, a strut 120 may be provided. In the illustrated embodiment, the strut 120 is removably couplable on one end to the door assembly 106 and pivotably coupled on an opposite end to the integrated service center 22. It will be appreciated, however, that the ends could be oppositely coupled, that is, one end could be pivotably coupled to the door assembly 106 and the other end removeably couplable to the service center 22, or removably coupled at both ends. By way of further example, a sliding strut may be provided, or a multipart strut may be provided. When the door assembly 106 is in an open position, the strut 120 may be used to keep the door assembly 106 in an open position by resisting longitudinal compression. Likewise, any suitable mechanism in lieu of a strut may be provided for maintaining the door assembly 106 in an open position.

The door assembly 106 may have a latching mechanism 114 to assist in maintaining the door assembly 106 in a closed position. The latching mechanism 114 may additionally have a locking mechanism, such as a key lock or padlock to provide further controlled access to the interior of the service center 22. The latching mechanism 114 can move from a latching position to an unlatching position. If the door assembly 106 is in a closed position, the latching mechanism 114 may be moved into a latching position to resist movement of the door assembly 106 towards an open position.

Referring to FIG. 2 and FIG. 3, in a first embodiment, the integrated service center 22 has a table assembly 112 coupled to the door assembly 106. The table assembly 112 has a stored position as shown in FIG. 2 and an extended position as shown in FIG. 3. When in an extended position, a table 136 of the table assembly 112 may be used to support, for example, a computer (not shown) or the like during service.

While the table 136 may be coupled to the door assembly 106 by any appropriate arrangement the table assembly 112 of the illustrated embodiment includes a first hinge 138, a second hinge 142, and the linkage 140. The first hinge 138 is attached to the table 136. The second hinge 142 is attached to an interior surface of the door assembly 106. The first hinge 138 and the second hinge 142 connect to a linkage 140. The linkage 140 can be any suitable length, such that a person can use the table 136 while standing on the ground surface 18. It will be appreciated that for a sufficiently small mobile machine 10, the distance between the ground surface 18 and the bumper 24 may be such that the linkage 140 and the second hinge 142 are no longer necessary, and the first hinge 138 may instead attach to the door assembly 106 and the table 136.

When the table assembly 112 is in a stored position, the table 136 and the linkage 140 fold together such that the table 136 on one side abuts an interior surface of the door assembly 106 and on another side abuts the linkage 140. The table 136 may be retained in a stored position by a clip 146. While the table assembly 112 is in a stored position, the door assembly 106 may move between an open position and a closed position. It will be appreciated that different methods of attaching and folding a table assembly 112 from an extended position to a stored position and from a stored position to an extended position are envisioned.

Figure 6:
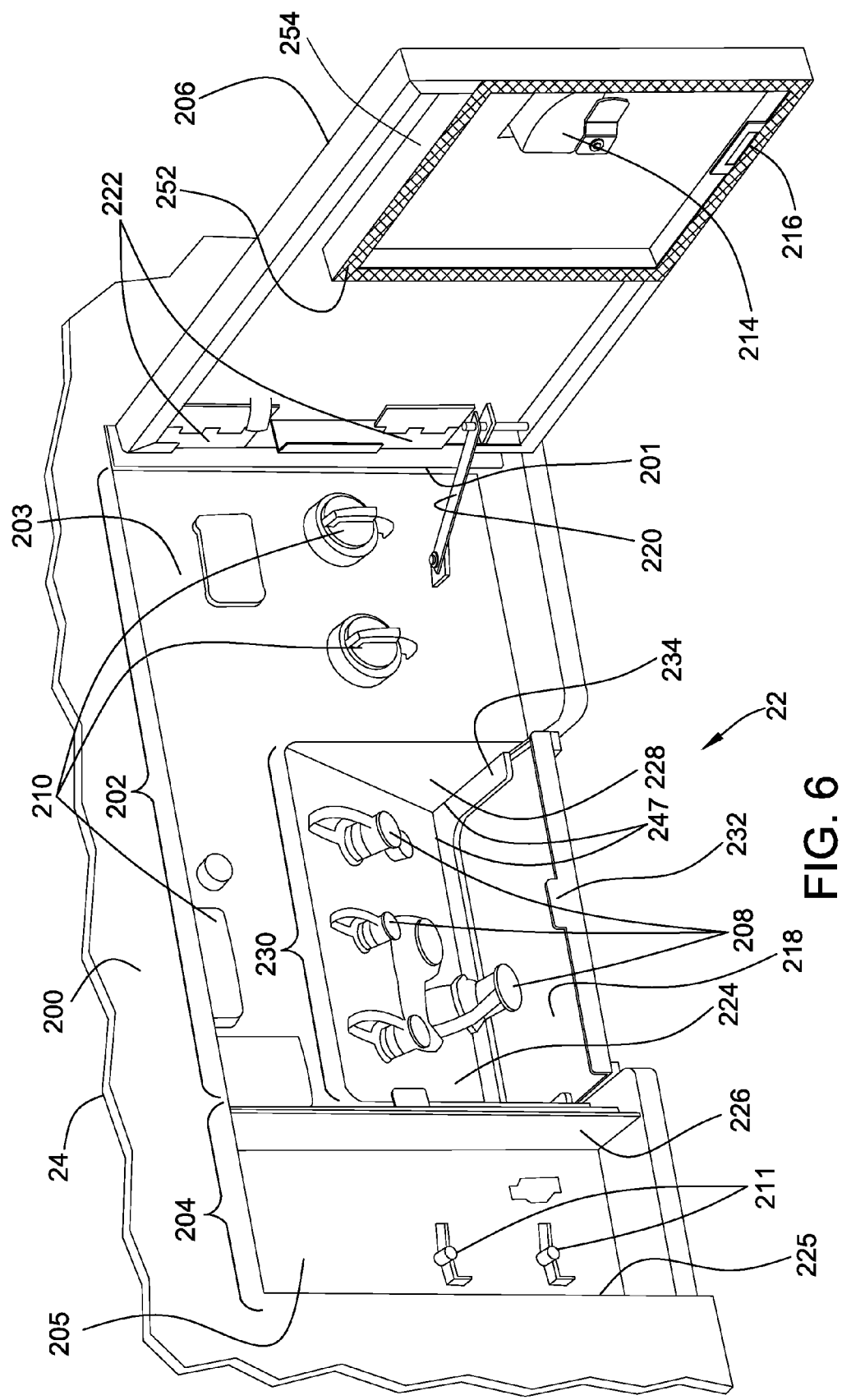
FIG. 6 is an isometric view of an alternative embodiment of an integrated service center according to teachings of the disclosure with an open door, and having a protrusion with a sealing surface on the door assembly.

A second embodiment of an integrated service center 22 is shown in FIG. 6. Similar numbered structures and parts have been given a new 2xx number for the second embodiment, which corresponds to 1xx numbers given in the prior embodiment. While each identified component will not necessarily be discussed in detail with regard to the embodiment of FIG. 6, such access points are identified with regard to FIG. 6 in order to provide a more complete understanding of the disclosed embodiment.

According to an aspect of the disclosure, the integrated service center 22 may be constructed to seal the fluid access points 208 from the electrical access points 210, 211 to discourage fluid from reaching the electrical access points 210, 211. In the second embodiment, the door assembly 206 may have a protrusion 254 with a sealing surface 252. The sealing surface 252 can be any suitable sealing material, such as, but not limited to rubber or plastic. When the door assembly 206 is in a closed position the sealing surface 252 may compress against the wall 203 of the first section 202 to form a seal. The protrusion 254 and sealing surface 252 may seal the fluid access points 208 from the electrical access points 210, 211. It will be appreciated that the door assembly 206 could have additional protrusions with sealing surfaces to seal and enclose other access points, such as the electrical access points 210 in the first section 202, or the entire first section 202 could be sealed from the environment. In other embodiments the protrusion and/or a sealing surface may have an alternate configuration, for example, a protrusion and sealing surface sealing the entire door assembly 206 against the integrated service center 22.

While the arrangement is illustrated in connection with a front end loader, the arrangement disclosed herein has universal applicability in various other types of machines as well. The term "machine" may refer to any machine that performs some type of operation associated with an industry such as mining, construction, farming, transportation, or any other industry known in the art. For example, the machine may be an earth-moving machine, such as a track type machine, excavator, dump truck, backhoe, motor grader, material handler or the like. Moreover, one or more implements may be connected to the machine. Such implements may be utilized for a variety of tasks, including, for example, brushing, compacting, grading, lifting, loading, plowing, ripping, and include, for example, augers, blades, breakers/hammers, brushes, buckets, compactors, cutters, forked lifting devices, grader bits and end bits, grapples, blades, rippers, scarifiers, shears, snow plows, snow wings, and others.

INDUSTRIAL APPLICABILITY

The present disclosure is applicable to mobile machines 10 that may require service by access to fluid and/or electrical access points 108, 110, 111 such as, for example, fill ports and drain ports for the machine's fluids, battery lockout switches, engine lockout switches, transmission lockout switches, service lighting switches, indicator lights, VIMS diagnostic screens, VIMS key switch, VIMS service ports, ET service ports, 240 VAC heater system, keypads, high voltage indicator, powered access ladder switch, engine shutoff switch, stairway light switch, diesel exhaust fluid purge lamp, jump start receptacle, message displays, power ports, service center light switch, gauges, sensors, relays, and fuses.

Ready access to the fluid and/or electrical access points 108, 110, 111 may be provided by the incorporation of an integrated service center 22 into the mobile machine 10. In placing the integrated service center 22 on a side 16 of the mobile machine 10 where an operator gains access to the operator station 26, some embodiments may provide convenient access to the operator and/or service technicians, particularly when the operator and/or service technician may additionally require access to the operator station 26 in connection such service, diagnostics, or the like.

In recessed placement of the integrated service center 22 within a bumper 24 along the side 16 of the machine 10, the fluid and/or electrical access points 108, 110, 111 may be protected from inadvertent damage that may otherwise result from environmental factors or the like.

In some embodiments, a service technician may access the integrated service center 22, while standing on a ground surface 18.

In some embodiments, an opening or openings 148 in the first and second sections 102, 104 may provide enhanced removal and expelling of debris and spilt fluids under the force of gravity from the first and second section 102, 104. Extending the opening to the outward bumper face 100 or outward facing wall 101 provides less area where debris and fluids may collect, and may allow a service technician to more easily remove the debris and fluids that do manage to collect.

In some embodiments, certain access points, such as the electrical access points 111 in the second section 104, may be accessed while the door assembly 106 is in a closed position. This allows some certain electrical access points 111, which might be accessed on a daily basis to be more easily accessed, and for less frequently accessed fluid access points 108 and electrical access points 110 to be covered by the door assembly 106 until needed. This may not only allow for quick access to certain electrical access points 111, it may additionally allow certain access points to be accessed by any person. Conversely, limited access may be provided to other of the fluid and electrical access points 108, 110 in the first section 102 inasmuch as they are covered by the door assembly 106. Access can be further restricted through use of a locking mechanism.

In some embodiments, a service technician may have enhanced access to the fluid and/or electrical access points 108, 110, 111 as a result of one or more of the access points being disposed at an angle γ to the substantially horizontal plane 150, substantially parallel to the ground surface 18. Such an angled disposition may provide for more ergonomic access to the access points. For example, in one embodiment, angle γ could be between 30 and 60 degrees to provide more ergonomic access. In another embodiment, angle γ could be between 45 and 60 degrees to provide more ergonomic access. In some embodiments, angled fluid and/or electrical access points 108, 110, 111 may be further supported in that they extend from an angled surface 124.

Additionally, in some embodiments, access may be enhanced by the provision of a removable bottom panel 118. With the bottom panel 118 removed, a service technician may readily access the fluid access points 108 located in the first section 102, in an illustrated embodiment, for example to facilitate filling or draining of the fluids in the mobile machine 10 without needing a ladder or otherwise straining to reach the fluid access points 108.

A number of user friendly features may be provided. In some embodiments, the integrated service center 22 may include an arrangement to prop open the door assembly 106 during service. In some arrangements, the integrated service center 22 may include structure for temporarily supporting other structures or devices. For example, the integrated service center 22 may be provided with structure to temporarily support the bottom panel 118 when it is removed for enhanced access to the fluid and/or electrical access points 108, 110, 111.

In some embodiments, the integrated service center 22 may include a table assembly 112 that may be used to support testing equipment, a laptop computer, or other device. In some embodiments, such a table assembly 112 may be stored when not in use. The structure of such a table assembly 112 may be tailored to the particulars of the machine 10, for example, level of the table assembly 112 when in an extended position may be varied, depending upon the size of the machine 10.

The fluid access points 108 may be separated from the electrical access points 110, 111. This separation prevents fluids of the mobile machine 10, which might leak from the fill and drain ports of the at least one fluid access point 108, from getting on or in the at least one electrical access point 110, 111. In some embodiments, further separation and sealing of the at least one fluid access point 108 from the at least one electrical access point 110, 111 may be achieved. For example, an embodiment may include sealing structure for sealing portions of the integrated service center 22 from other sections. Some embodiments may include a protrusion 254 and a sealing surface 252. When the door assembly 206 of the second embodiment is in a closed position, the sealing surface 252 presses against the first section 202 and against the bottom panel 218 to at least partially seal the fluid access points 208 from the electrical access points 210, 211. When the door assembly 206 is in an open position, the fluid and electrical access points 208, 210 may be accessed as described above. Some embodiments may include alternate or additional protrusions and sealing surfaces to provide additional separation between the at least one fluid access point 208 and the at least one electrical access point 210, 211.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

We claim:

1. An integrated service center for a mobile machine, the integrated service center comprising:
    an outward facing wall having a substantially vertical orientation;
    a first section recessed from the outward facing wall, having a plurality of walls and a lower end, the plurality of walls forming an opening in the lower end, the opening extending to the outward facing wall;
    at least one fluid access point disposed in the first section at an angle to a substantially horizontal reference plane, the angle being between 30 and 60 degrees below the reference plane;
    a second section recessed from the outward facing wall;
    at least one electrical access point disposed in the second section; and
    at least one door assembly mounted to move between an open position and a closed position, the door assembly being disposed to abut at least a portion of the outward facing wall and cover at least the first section when in the closed position.

2. The integrated service center of claim 1, wherein the second section has a plurality of walls and a lower end, the plurality of walls forming an opening in the lower end, the opening extending to the outward facing wall.

3. The integrated service center of claim 1, where the angle is between 45 and 60 degrees below the reference plane.

4. The integrated service center of claim 1, wherein the integrated service center is recessed from a substantially vertical outward bumper face of a bumper on the mobile machine.

5. The integrated service center of claim 1, where at least one electrical access point is disposed in the first section.

6. The integrated service center of claim 1, wherein the door assembly has a sealing surface for fluidly sealing at least a portion of at least one of the first section and the second section.

7. The integrated service center of claim 1, wherein the first section has an angled surface recessed from the outward facing wall, the angled surface forms an angle with the reference plane, the angle being between 30 and 60 degrees below the reference plane, and the at least one fluid access point being disposed perpendicularly through the angled surface.

8. The integrated service center of claim 1, wherein the at least one fluid access point is located a distance above a ground surface such that the at least one fluid access point can be reached by a service technician standing on the ground surface.

9. The integrated service center of claim 1, wherein the first section includes a detachable bottom panel extending along the lower end.

10. The integrated service center of claim 1, wherein the door assembly has a table assembly, adapted to pivot relative to the door between a stowed position, which does not prevent the door from moving into the closed position, and an extended position.

11. A mobile machine, the mobile machine comprising:
at least one bumper having an outward bumper face with a substantially vertical orientation,
the bumper accepting an integrated service center, the integrated service center including:
a first section recessed from the outward bumper face and containing at least one fluid access point, the at least one fluid access point being disposed at an angle to a substantially horizontal reference plane, the angle being between 30 and 60 degrees below the reference plane;
a second section recessed from the outward bumper face and containing at least one electrical access point; and
at least one door assembly adapted to move between an open position and a closed position wherein the door assembly covers at least the first section.

12. The mobile machine of claim 11, wherein the first section has a plurality of walls and a lower end, the plurality of walls forming an opening in the lower end, the opening extending to the outward bumper face.

13. The mobile machine of claim 11, wherein the second section has a plurality of walls and a lower end, the plurality of walls forming an opening in the lower end, the opening extending to the outward bumper face.

14. The mobile machine of claim 11, wherein the angle is between 45 and 60 degrees below the reference plane.

15. The mobile machine of claim 11, where at least one electrical access point is disposed in the first section.

16. The mobile machine of claim 11, wherein the door assembly has a sealing surface for fluidly sealing at least a portion of at least one of the first section and the second section.

17. The integrated service center of claim 11, wherein the first section has an angled surface recessed from the outward bumper face, the angled surface forms an angle of between 30 and 60 degrees with and below the reference plane, and the at least one fluid access point is disposed perpendicularly through the angled surface.

18. The mobile machine of claim 11, wherein the first section includes a detachable bottom panel extending along the lower end.

19. The mobile machine of claim 11, wherein the door assembly has a table assembly, adapted to pivot relative to the door between a stowed position, which does not prevent the door from moving into the closed position, and an extended position.

20. A mobile machine, the mobile machine comprising:
at least one bumper having an outward bumper face with a substantially vertical orientation,
the bumper accepting an integrated service center, the integrated service center including:
a first section recessed from the outward bumper face, having a plurality of walls and a lower end, the plurality of walls forming an opening in the lower end, the opening extending to the outward bumper face;
an angled surface recessed from the outward bumper face and forming an angle with a substantially horizontal reference plane, the angle being between 30 and 60 degrees below the reference plane;
at least one fluid access point disposed substantially perpendicularly through the angled surface;
a second section recessed from the outward bumper face and containing at least one electrical access point; and
at least one door assembly adapted to move between an open position and a closed position wherein the door assembly covers at least the first section.

* * * * *